Nov. 1, 1927.
H. MOCK
1,647,742
FIRELESS COOKER
Filed Jan. 16, 1925   2 Sheets-Sheet 1
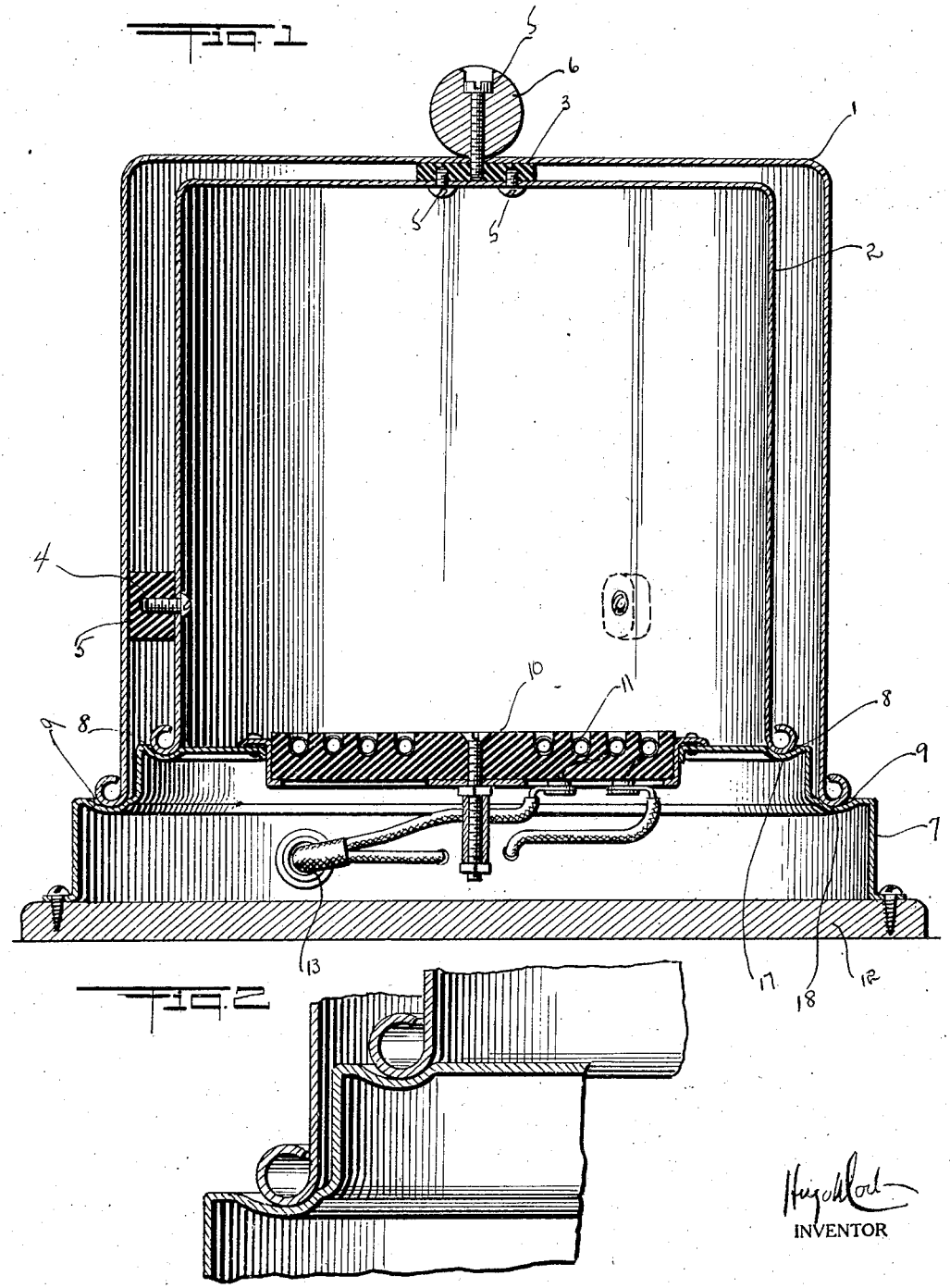

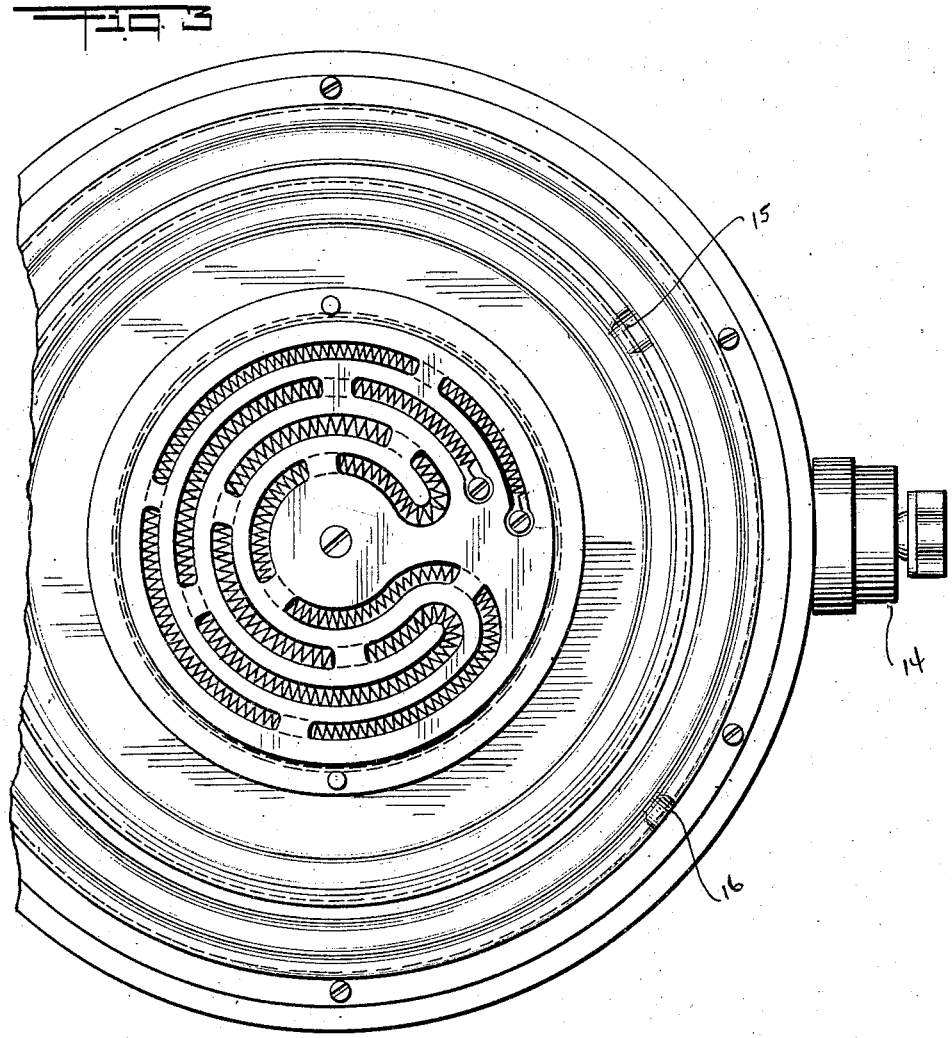
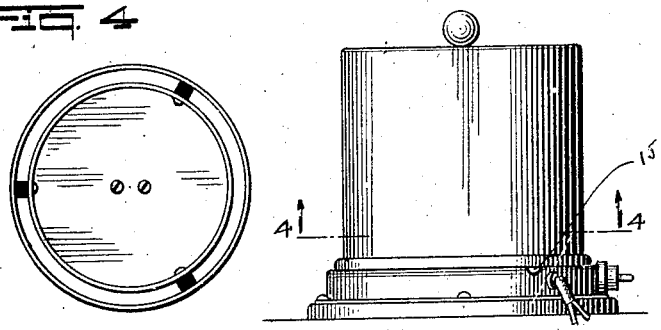

Patented Nov. 1, 1927.

1,647,742

UNITED STATES PATENT OFFICE.

HUGO MOCK, OF NEW YORK, N. Y.

FIRELESS COOKER.

Application filed January 16, 1925. Serial No. 2,935.

This invention relates to fireless cookers and more particularly to that form of fireless cooker in which an electric heating unit is employed.

Further objects of the invention will be apparent from the specification and drawings in which—

Figure 1 is a vertical sectional view of my improved fireless cooker,

Figure 2 is an enlarged detail view showing the manner in which the metallic hoods are sealed upon the base of the fireless cooker, Figure 3 is a plan view of the base of the cooker, Figure 4 is a sectional view of the hoods along the line 4—4 of Figure 5, and Figure 5 is a perspective view of the entire cooker assembled.

1 and 2 indicate concentric metallic hoods of varying diameter inserted one over the other, which are joined to each other by the heat insulating members 3 and 4, the insulating members 3 and 4 being fastened by means of the rivets 5. 6 is a non-metallic handle by which the hoods 1 and 2 may be lifted off of the cooker together. The insulating members 3 and 4 should be made of bakelite, wood or other non-metallic material which will not give off any cooking odors.

An important feature of this invention is the metallic base of the cooker 7 which preferably is made of one piece having depressions at 8 and 9 as shown, in which the hoods 1 and 2 fit. It will be noted from the enlarged detail of Figure 2 that the hoods 1 and 2 fit snugly into the depressions in the base 7 on the inner and not on the outer edges of these depressions. The heating unit 10 having the resistance wire 11 is inserted in the center of the base 7 and it should be noted that the heating unit is itself made of an insulating material such as porcelain in which the heating wire 11 is embedded so that the porcelain base of the heating unit itself acts as a non-conductor and the heat is transmitted upwardly only. The base 7 is riveted to a wooden stand 12, the current being transmitted to the unit through the aperture 13, a switch 14 serving to turn on and shut off the current.

Another feature of this invention are the depressions 15 and 16 in the base 7, which depressions serve as outlets for any water which may be condensed in the grooves of the base 17 or 18. An objection to many forms of fireless cookers is that the steam which is developed recondenses and falls either upon the heating element or back into the food, whereas with the outlets 15 and 16, any water which falls into the grooves 17 or 18 will naturally run out of the cooker and cannot be reabsorbed into the food.

The cooking pot is, of course, placed upon the heating unit and preferably covers the same, so that any water evolved in cooking will tend not to fall upon the heating unit but on to the base 7. The continuous air space between the hoods 1 and 2 and the air space under the base 7 serve as an excellent heat insulator, so no other heat insulation is required in this type of cooker.

Having fully described my invention, what I claim is:—

1. In a fireless cooker, a series of concentric hoods seated upon a common base so as to enclose a non-conducting air space between said hoods, a base constructed of a single sheet of metal having a number of grooves therein to seat said hoods, a non-conducting enclosed air space beneath said base and an electric heating unit located in said base and substantially level with the bottom of the innermost hood.

2. In a fireless cooker, a series of concentric hoods seated upon a common base so as to enclose a non-conducting air space between said hoods, a base constructed of a single sheet of metal having a number of grooves therein to seat said hoods, a non-conducting enclosed air space beneath said base and an electric heating unit located in said base and substantially level with the bottom of the innermost hood, and openings in said base for conducting away any waters of condensation evolved from the interior of said cooker by gravity.

3. In a fireless cooker, a series of concentric hoods seated upon a common base so as to enclose a non-conducting air space between said hoods, a common metal base for said hoods having a number of grooves therein to seat said hoods, said base having a non-conducting enclosed air space beneath same, an electric heating unit positioned in the center of said base, said heating unit being substantially level with said base and with the bottom of the innermost hood.

4. In a fireless cooker, a series of concentric hoods seated upon a common base so as to enclose a non-conducting air space between said hoods, a metal base having grooves therein adapted to seat said hoods, a depression in the center of said base and an electric heating unit located in said depression, said electric heating unit being substantially level with said base and with the bottom of said innermost hood.

In testimony whereof I hereunto affix my signature.

HUGO MOCK.